Aug. 17, 1926.

P. J. MURRAY ET AL 1,596,757

HYDRAULIC STABILIZER

Filed July 5, 1923   2 Sheets-Sheet 1

Inventors
Patrick J. Murray
Matthew L. Clark
by their Attorneys
Baldwin Wight

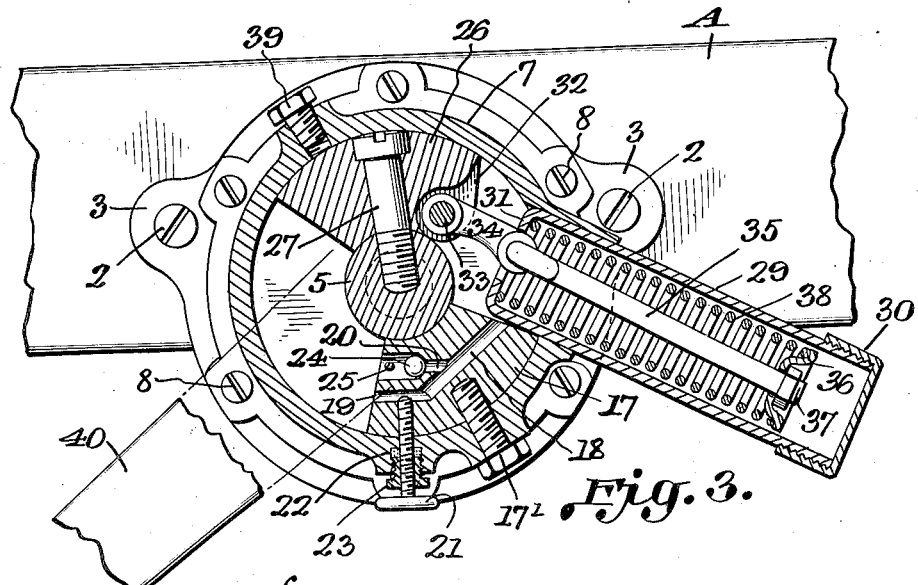

Patented Aug. 17, 1926.

1,596,757

UNITED STATES PATENT OFFICE.

PATRICK J. MURRAY AND MATTHEW L. CLARK, OF CARBONDALE, PENNSYLVANIA, ASSIGNORS TO ADVANCE CAR SPECIALTY MANUFACTURING COMPANY, OF SCRANTON, PENNSYLVANIA.

HYDRAULIC STABILIZER.

Application filed July 5, 1923. Serial No. 649,512.

An object of our invention is to provide simple and efficient means for preventing shocks and rebounds due to irregularities in the road way over which an automobile or similar vehicle is traveling.

Another object is to provide a combination of spring and hydraulic means which shall coact for the production of this result.

Another object is to provide means whereby an increase in the pressure on the fluid within the stabilizer will automatically cause a tighter fit of the packing and thus prevent escape of the fluid.

Another object is the provision of means whereby the device may be attached to different cars in varying positions without the necessity of modifying either the attachment or the car.

Other objects will be apparent from the following detailed description and the appended claims.

In the drawings:—

Figure 3 is a similar section with the parts in different position.

Figure 4 is a section on the line 4—4 of Figure 2.

Figure 5 is an edge view of the connections between the stabilizer proper and the axle.

Figure 6 is a side view of the same connections.

Figure 1:
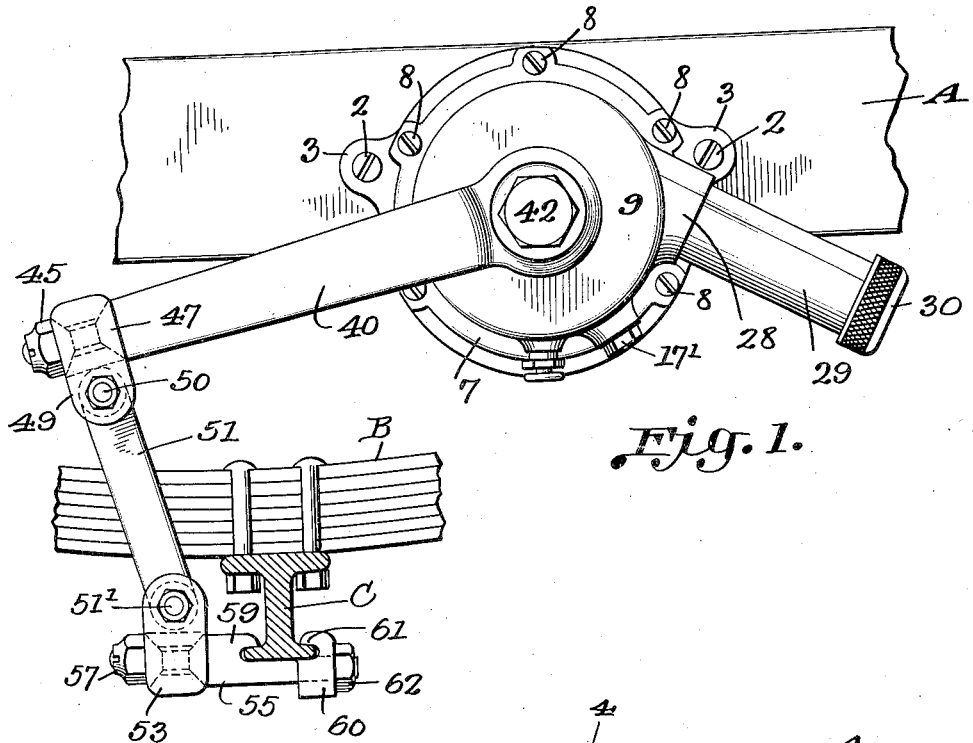
Figure 1 is a side elevation of the device attached to the car with the axle in section.

There is illustrated a portion of the side frame A, spring B, and axle C, which may be of any desired construction. A base plate 1 is fastened to the side frame member A by screws 2 which pass through ears 3 of said plate. The plate 1 is provided with a central depression 4 in which fits the end of the shaft 5. The plate is also provided with a concentric depressed rim 6 to which the body 7 of the device is attached by a plurality of screws 8 which are preferably spaced equidistantly. The body 7 has a preferably integral cover 9 provided with a central bearing 10 for the outer end of the shaft 5. This bearing member is externally threaded and a packing nut 11 screws thereon, compressing a packing ring 12 as shown. The nut also bears against packing 14 held in place by a metal ring 13. A hardened steel bushing 15 surrounds the shaft 5 within the bearing member, and a passage 16 leads from the metal ring 13 to the interior of the body.

A buttress or abutment member 17 is held within the body 7 by a screw 17', and fits between the outer wall of the body and the shaft 5, the inner portion of the abutment 17 being curved concentrically with the shaft 5 as illustrated. This buttress or abutment member divides the interior of the body into two portions. Fluid contained in the body is permitted to pass from one side of the buttress to the other through a relatively large passage 18 which has one smaller branch 19 and a second branch 20. The size of the passage 19 may be limited by a screw 21 which passes through the wall of the body and the buttress into the passage. Packing 22 for this screw 21 may be held in place by a jam nut 23. The passage 20 is controlled by a ball valve 24 held in an enlarged outer end of the passage by a pin 25. This will permit relatively free passage of the fluid in one direction and practically stop it from moving in the other direction.

Within the body and opposite to the buttress 17 is a similarly shaped movable piston member 26 which is fastened to the shaft 5 by means of the screw 27 or in any desired member. This member fits snugly between the shaft 5 and the inner wall of the body and prevents passage of fluid from one side to the other. The buttress 17 and piston 26 divide the interior of the body into two separate compartments which are adapted to be filled with fluid. The movement of the piston changes the size of these compartments and fluid can pass from one to the other only through the passages 18, 19 and 20 as above recited. Since these passages are relatively small sudden movements of the piston will be cushioned by the resistance to the movement of the fluid.

Rigidly held within a hollow boss 28 of the body 7 is a tubular member 29 having a cap 30 at its outer end and its inner end partly closed by spinning over the metal of the tube at 31. The piston 26 has a slot 32 therein, and mounted on a pin 33 within this slot is a link member 34 which connects in any suitable manner to a rod 35 within the tubular member 29. At its outer end the rod is provided with a washer 36 and a nut 37, and a spring 38 coiled around said rod bears at one end against said washer and at its inner end against the spun over part 31 of the tube 29. The connection between the link 34 and the rod 35 is a pivotal connection, and the link 34 turns on the pin 33, or it may be rigid therewith and the pin mounted to turn in the piston member 26.

The body 7 has a filling opening which is adapted to be closed by a screw plug 39. An arm 40 fits over the non-circular end 41 of the shaft 5, so that a turning movement of the arm will be transmitted to the shaft. A nut 42 holds the arm in place on the shaft. At its outer end the arm 40 terminates in a reduced threaded portion 43 having a bevel 44 connecting the arm 40 with the part 43. A nut 45 having a similar bevel 46 screws on the end of the part 43. A member 47 having a bore larger than the part 43 is formed with bevels to match the bevels 44 and 46 and is held in position by the nut 45 as shown in Figure 6. The space 48 between the part 43 and the member 47 is left for lubricant, and the parts are loose enough to allow a slight rocking motion.

The member 47 is provided with ears 49 between which fits the end of a link 51, a bolt or pin 50 passing through the ears and link and affording a pivotal connection. The other end of the link 51 fits between ears 52 of a member 53 like the member 47, and is held in position by a pivot pin 51'. The member 53 is held in place on the reduced portion 54 of a clamp element 55 by a nut 57 which has a bevel 58, while the element 55 has a bevel 56. The members 47 and 53 are interchangeable, and when the link is connected thereto, there is no difficulty in assembling the parts since either end can be placed in either position.

The clamp element 55 has a lug 59 to hook over the lower flange of the usual axle beam as shown in Figure 1, and a co-operating clamp member 60 has a similar lug 61 to engage the other side of the axle beam, and is held in place by a nut 62 threaded on the end of the member 55.

The operation of the device will be evident, but certain features may be recapitulated. When the wheels strike a sudden elevation in the roadway the axle moves upward relatively to the body, and the parts assume the position shown in Figures 1 and 2. The spring 38 tends continually to move the parts to this position, and since the movement of the piston in this direction forces the liquid through the passageway 18 and both passageways 19 and 20, there will be relatively little resistance offered to this movement. Practically no movement will be transmitted to the frame A of the vehicle.

With the parts in this position, any upward movement of the body relative to the axle or downward movement of the axle relative to the body, will move the parts to or beyond the Figure 3 position. In this movement the spring 38 is placed under compression, and the liquid is forced back through the passageway 19, the passageway 20 being closed at this time by the ball valve 24. There will obviously be considerable resistance to this movement and consequently but little of the shock given the wheels or chassis will be transmitted to the body of the vehicle.

Figure 2:
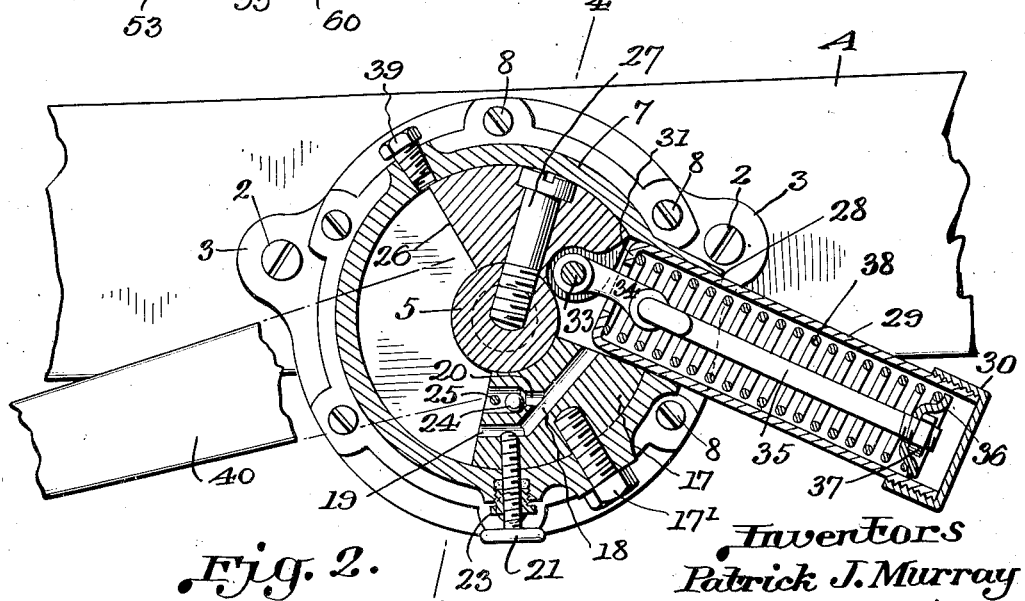
Figure 2 is a section therethrough.

If on the contrary when the parts are in the Figure 3 position, which may be termed an intermediate position, the wheel should drop suddenly into a depression, the body would go down with the same part way, but the following upward movement of the wheel would again move the parts toward the Figure 2 position and practically no shock or sudden movement would be transmitted to the body as stated above. It will thus be evident that the attachment acts to prevent sudden shocks and jars to the body and stabilizes the movements of the parts.

When the fluid is forced into the chamber between the piston 26 and the buttress 17, or that chamber lying on the left hand side in Figures 2 and 3, the fluid will also be forced through the channel 16 against the ring member 13 which will be forced against the packing 14 and tighten the same to prevent egress of fluid. It is thus evident that the increase of pressure which would tend to cause leakage, automatically tightens the packing to prevent such leakage.

The means for connecting the device to the axle is very simple and prevents confusion owing to the fact that certain parts are interchangeable. The connections also permit sufficient play to enable them to adjust themselves to all conditions. Since the screws 8 are substantially equidistant from each other, the body with all its elements may be moved to different positions on the base plate 1, if necessary to adapt the device to different positions or varying cars.

It is obvious that various changes may be made in the device, and that certain parts may be used without others, or in connection with equivalent elements of different form. In general it is to be understood that the invention is limited only by the scope of the appended claims.

We claim as our invention:—

1. A hydraulic stabilizer comprising a base plate fixed to the vehicle frame, a body member adjustable to different positions on the base plate, a shaft within said body member having a bearing at one end in the base plate, an oscillating piston carried by said shaft, an arm connected to the outer end of the shaft, and means for operatively connecting said arm to the chassis.

2. A hydraulic stabilizer comprising a body member, a partition dividing the same into two fluid containing chambers, a shaft within said body, a piston oscillatable with said shaft, packing for said shaft, and means whereby an increase of fluid pressure in one chamber will always automatically tighten said packing.

3. A hydraulic stabilizer comprising a body member, a partition dividing the same into two fluid containing chambers, a shaft within said body, a piston oscillatable with said shaft, means for permitting fluid to pass from one chamber to another, packing for said shaft, and a passage from one chamber to the packing, whereby an increase of pressure in said chamber will automatically tighten said packing.

4. A hydraulic stabilizer comprising a hollow body portion, a shaft therein, a piston mounted to oscillate with said shaft, a tubular extension from said body, a spring in said extension, and means connecting the spring to the piston and permitting the spring to move in a right line during the oscillations of the piston.

5. A hydraulic stabilizer comprising a hollow body portion, a shaft thereon, a piston on said shaft, a tubular extension from said body, a spring in said extension, a rod connected at its outer end to the spring, and a link pivotally connected to the piston and to the inner end of the rod whereby the spring is compressed by a right line movement during rotary oscillations of the piston.

6. A hydraulic stabilizer comprising a hollow body portion, a shaft therein, a piston mounted to oscillate with said shaft, a tubular extension from said body having an inturned ledge at its inner end, a spring in said extension bearing against said ledge at one end, and means connecting the other end of the spring to the piston whereby the spring will move in a right line during oscillations of the piston.

In testimony whereof, we have hereunto subscribed our names.

PATRICK J. MURRAY.
MATTHEW L. CLARK.